March 7, 1944.        P. VAN SITTERT        2,343,595
PORTABLE TOOL
Original Filed May 26, 1939        3 Sheets-Sheet 1

INVENTOR
PAUL VAN SITTERT
BY
ATTORNEY

INVENTOR
PAUL VAN SITTERT
BY
ATTORNEY

March 7, 1944.  P. VAN SITTERT  2,343,595
PORTABLE TOOL
Original Filed May 26, 1939   3 Sheets-Sheet 3

INVENTOR
PAUL VAN SITTERT
BY
ATTORNEY

Patented Mar. 7, 1944

2,343,595

UNITED STATES PATENT OFFICE 2,343,595

PORTABLE TOOL

Paul Van Sittert, Shaker Heights, Ohio, assignor to The Cleveland Pneumatic Tool Company, Cleveland, Ohio, a corporation of Ohio Substituted for abandoned application Serial No. 275,869, May 26, 1939. This application May 23, 1940, Serial No. 336,871

13 Claims. (Cl. 78—48)

This invention relates broadly to machines for performing work such as riveting, stamping, punching, shearing or pressing, but more particularly to improvements in riveting machines wherein pressure rather than impacts is applied on the rivet. This application is a substitute for my abandoned application Serial No. 275,869 filed May 26, 1939.

One object of this invention is to produce an improved riveting machine wherein the rivet set or tool is moved into engagement with the rivet at a rapid rate of speed and is subsequently driven at a smaller rate of speed for performing the work.

Another object of this invention is to produce such a machine wherein the initial movement of the tool into engagement with the work is accomplished by virtue of relatively low pressure exerted on the tool, which pressure is subsequently automatically increased for upsetting the rivet.

Another object of this invention is to provide such a riveting machine with means for varying the extent of pressure available for effecting the working stroke of the tool, thereby assuring even upsetting of several rivets of the same size irrespective of the length of application of the tool on each rivet.

Other objects and advantages more or less ancillary to the foregoing reside in the specific construction and aggroupment of the elements peculiar to this structure, as will become apparent from a more complete examination of this specification.

Figure 1:
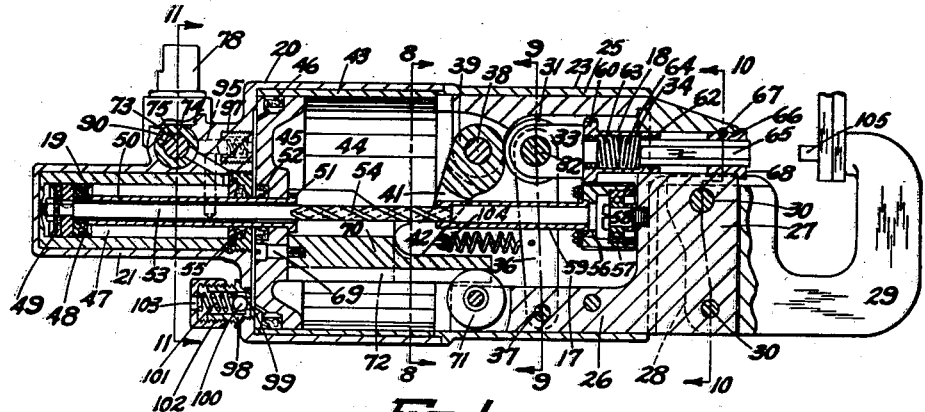
Fig. 1 is a longitudinal sectional view of a riveting machine embodying the invention. In this figure, the movable parts are shown at the beginning of their working stroke.

Referring to the drawings, 20 represents the main cylinder housing formed with a reduced portion 21 extending coaxially from one end thereof, and having secured to its other end by bolts 22 a front casing 23, which casing is provided with a circular flange 24 forming one end of the housing 20 and with a substantially rectangular portion 25 extending longitudinally from the housing 20. Rigidly mounted within the casing 23, there is a substantially rectangular block 26 protruding from the front end of the casing where it is reduced in thickness as at 27 to fit between two side walls 28 of a work supporting member or yoke 29, which side walls are rigidly secured to the block 26 by cross bolts 30.

Within the housing 20 there is pressed a liner 43 forming internally thereof a relatively large cylindrical chamber 44, within which is reciprocably mounted a piston 45 carrying a packing ring 46 acting as a fluid tight joint between the piston and the liner. Within the small portion 21 of the housing 20, there is also pressed a liner 19 forming in the interior thereof a chamber 47 of substantially square cross section and materially smaller than the chamber 44. Reciprocable within the chamber 47, there are two square pistons 48 and 49, the former mounted on one end of a small tube 50 which extends through the piston 45 where it is terminated by a head 51 capable of engagement with the piston for driving it rearwardly as will be explained later. Rigidly secured to the piston 49, there is a rod 53 extending through the tube 50 into a cavity 17 formed within the stationary block 26. This rod is provided with double helical splines 54 of the usual Yankee screw driver type. To prevent leakage between the piston 45 and tube 50, and the liner 19 and tube 50, there are provided packings 52 and 55 respectively.

Located within the bottom of the cavity 17, there is a gear 56 rotatably mounted on a roller bearing 57 held in operative position by a stud 58. To the gear 56 is rigidly secured a sleeve nut 59 extending upwardly therefrom in coaxial alignment with the rod 53 and having its upper end internally threaded or splined to receive the corresponding splined end of the rod 53.

Slidable through the stationary block 26, there is a rivet set assembly 18 including a clevis 33 located within the cavity 17 provided with a screw threaded stem 63, a sleeve 34 and a plunger 65. The sleeve 34 is provided with internal portions 61 and 62 threaded in opposed directions, the former to receive the correspondingly threaded stem 63 and the latter a threaded head 64 formed on the plunger 65, which plunger is preferably of polygonal cross section and slidable through a bushing 66 of corresponding internal cross section. The bushing 66 is held in position by a removable cross pin 67, and is formed with a knurled annular flange 68, the purpose of which will be explained later. Formed on the sleeve 34, there is an integral pinion 69 in operative engagement with the gear 56.

The clevis 33 carries a cross pin 32 on which is rotatably mounted a roller 31. This pin 32 projects laterally beyond the clevis to pivotally receive one end of two parallel links 35 and 36 each having its other end pivotally connected to the block 26 by a cross pin 37. Above the roller 31, the block 26 carries a pin 38 parallel to the pin 32, on which is rotatably mounted a cam 39 engaging the roller 31 and having two arms 41 extending laterally therefrom, each arm being terminated by a rounded end 42.

Rigidly secured to the large piston 45 by one or more bolts 69, there is a tail 70 extending longitudinally therefrom partway into the cavity 17, and shaped in a manner enabling free movement of the tube 50 and rod 53 therethrough.

This tail is adequately shaped to pivotally receive the rounded ends 42 of the arms 41 extending from the cam 39. In order to resist the lateral thrust exerted on the tail 70 due to its engagement with the cam 39, there is pivotally carried by the stationary block 26 a roller 71 fitted within a track 72 extending longitudinally of the tail 70.

Figure 6:
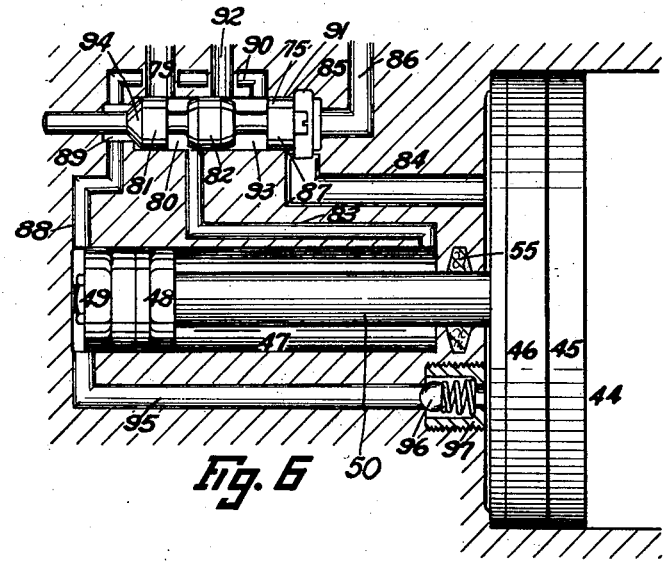
Fig. 6 is a diagrammatical view of the pistons and the valve incorporated in the machine together with the system of passages leading therebetween.

The casing 20 adjacent the extension 21 is provided with a bore 73 having pressed therein a bushing 74 within which is slidably mounted a spool valve generally designated by 75, which valve is operated by a handle 76 rotatably mounted on a pin 77 carried by the casing 20. Adjacent the bore 73, the housing 20 is also provided with an inlet connection 78 through which motive fluid may be admitted to the valve 75 through an inlet port 79. Leading from the valve 75 to the chamber 44 and the smaller chamber 47, there is a plurality of ports and passages diagrammatically illustrated in Figs. 6 and 7, which are necessary for the operation of the pistons 45, 48 and 49. For instance, when the valve 75 is positioned as shown in Fig. 6, the motive fluid from the inlet port 79 will flow to the lower end of the chamber 47 via an annular groove 80 formed between the two heads 81 and 82 of the valve 75, and a passage 83. In this instance, the upper end of the main chamber 44 is in communication with the atmosphere via a passage 84, a groove 85 and a port 86. In this position of the valve 75, the groove 85 is uncovered by the valve head 87 while the upper end of the chamber 47 is also in communication with the atmosphere through a passage 88, a groove 89 and a port 90 opening into the bore 91 within which is slidably mounted the valve 75. In the bore 91, the port 90 is made to communicate with an exhaust port 92 through a valve groove 93 formed between the heads 82 and 87.

Figure 7:
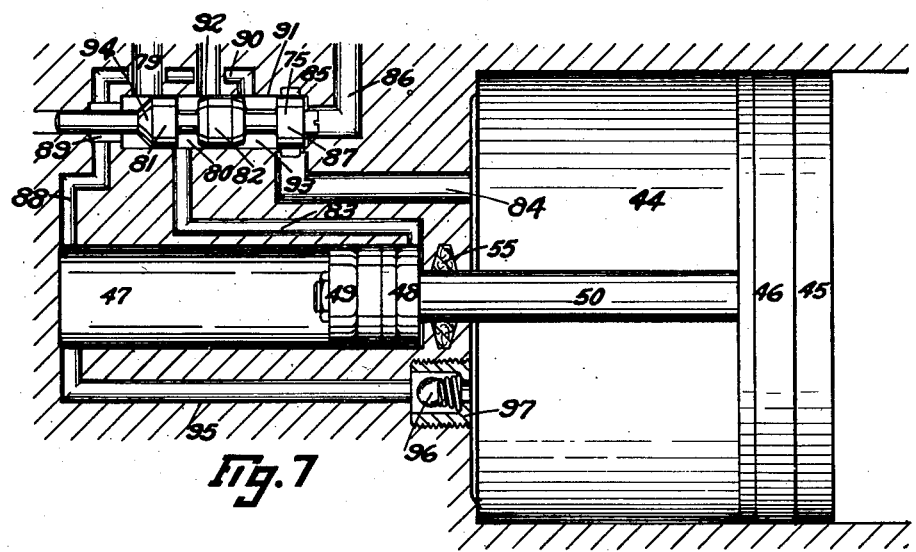
Fig. 7 is a view similar to Fig. 6 illustrating the movable parts in another position.
Figure 8:
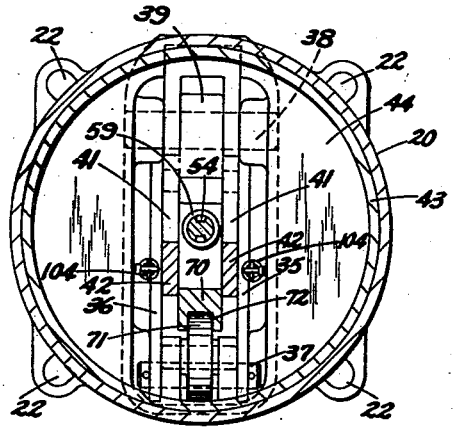
Fig. 8 is an enlarged cross sectional view taken in a plane indicated by line 8—8 in Fig. 1.
Figure 11:
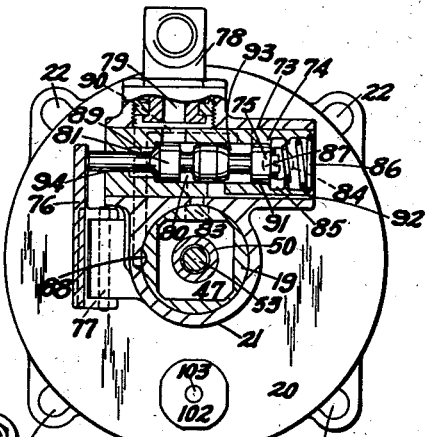
Fig. 11 is an enlarged cross sectional view taken in a plane indicated by line 11—11 in Fig. 1.
Figure 9:
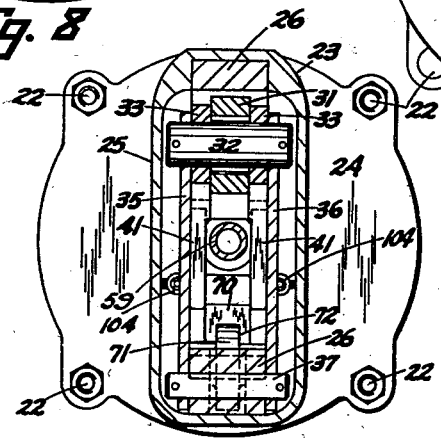
Fig. 9 is an enlarged cross sectional view taken in a plane indicated by line 9—9 in Fig. 1.
Figure 10:
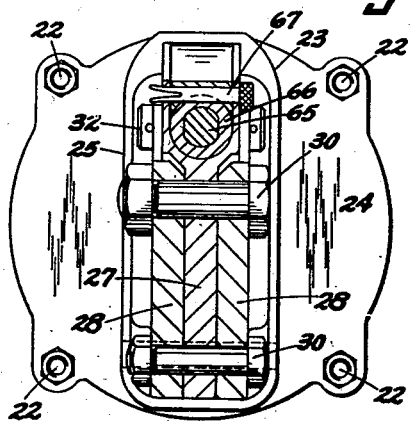
Fig. 10 is an enlarged cross sectional view taken in a plane indicated by line 10—10 in Fig. 1.
Figure 12:
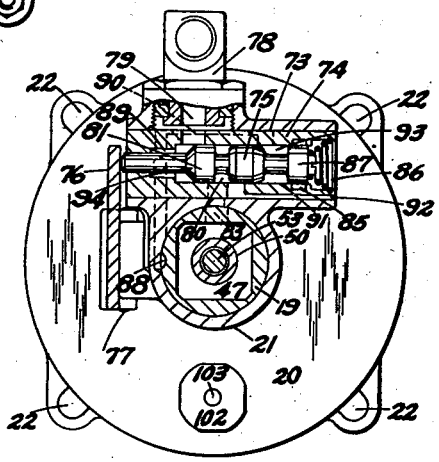
Fig. 12 is a view similar to Fig. 11, showing the valve in another position.

When the valve 75 is shifted into the position shown in Fig. 7, the tapered seat 94 of the valve head 81 normally closing the end of the groove 89, is now moved in spaced relation therewith to afford communication between the port 79 and the passage 88, thus enabling admission of motive fluid into the upper end of the chamber 47. Simultaneously, the lower end of that chamber is made to communicate with the exhaust port 92 through the passage 83 and the valve groove 80, while the port 84 previously in communication with the exhaust port 86 is now closed by the valve head 87. After having acted on the piston 49 in a manner hereinafter to be explained, the motive fluid will be admitted into a passage 95 leading from the upper end of the chamber 47 into the upper end of the main chamber 44, which passage is also controlled by a spring seated valve 96 operatively mounted within a removable plug 97 screwed into the housing 20.

Detachably secured to the housing 20, there is a pipe nipple 98 opening into the upper end of the chamber 44 through a port 99 normally closed by a ball valve 100 urged into seated position by a compression spring 101, the compression of which is adjustable by a nut 102 having a port 103 extending therethrough.

The roller 31 is maintained in engagement with the cam 39 by the effort of two tension springs 104 operatively associated with the links 35 and 36 and the casing 25.

In the operation of the machine, when the valve 75 is positioned as shown in Fig. 7, the motive fluid admitted into the small chamber 47 through the passage 88 will act on the piston 49 for driving it forwardly, thereby causing the rod 53 to be pushed through the sleeve nut 50 for causing the rotation of the latter and the consequential rotation of the gear 56, which gear is operatively engaged with the pinion 69 of the sleeve 34 for rotating the latter. During rotation of the sleeve 34, the stem 63 and plunger 65 are held against rotation, thus causing axial movement of the sleeve toward or away from the yoke 29. Since the threads of the plunger head 64 are in opposed direction to that of the stem 63, and the stem is momentarily held against endwise movement one way by the cam 39 engaging the roller 31 and in the other direction by the springs 104, it will be understood that rotation of the sleeve effecting its axial movement will also impart axial movement to the plunger 65 in the same direction as that of the sleeve but at a double rate of speed. In the present construction, the helical splines 54 and threaded connections 61 and 62 are calculated to result in the longitudinal movement of the plunger 65 toward the yoke 29 during the forward stroke of the piston 49 from the position in Fig. 1 to that in Fig. 2. In other words, during the forward or working stroke of the piston 49, the plunger 65 will be moved into operative engagement with the work. Upon contact of the plunger with the rivet, further movement of the piston 49 and rod 53 will be prevented, thereby causing the pressure of the motive fluid admitted into the chamber 47 through the passageway 88 to increase sufficiently for compressing the spring normally holding the valve 96 in closed position relative to the passage 95, thus enabling the motive fluid from the chamber 47 to now flow into the chamber 44 through the passage 95 and plug 97.

Figure 2:
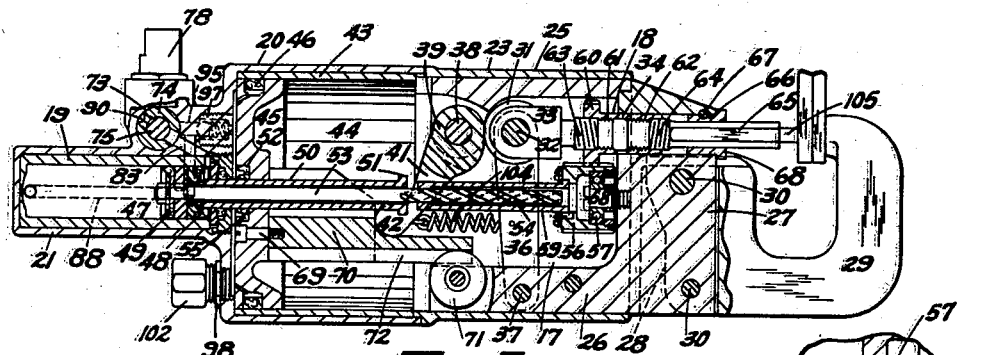
Fig. 2 is a view similar to Fig. 1 showing the movable parts positioned for engagement of the rivet set with the rivet.

Pressure fluid now acting on the large piston 45 will drive the same forwardly, that is toward the yoke 29, causing its tail 70 engaging the arms 41 of the cam 39 to impart rotation to the cam in a counterclockwise direction in Fig. 2 for exerting pressure on the roller 31 effecting axial movement of the rivet set assembly 18 toward the yoke 29, thereby resulting in the upsetting of the rivet 105 by the plunger 65. Due to the shape of the cam 39, it will be understood that a great pressure is exerted on the rivet set during the working stroke of the piston 45, which stroke is materially longer than that of the rivet set as clearly shown in Fig. 2.

Figures 3, 4, 5:
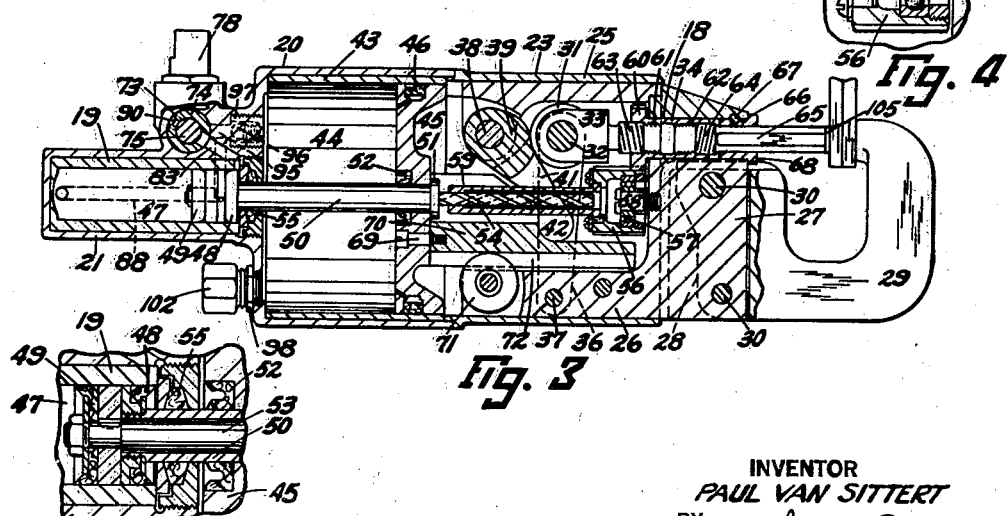
Fig. 3 is a view similar to Fig. 1 showing the movable parts at the end of their working stroke.
Fig. 4 is an enlarged view of a portion of the tool shown in Fig. 1.
Fig. 5 is an enlarged view of the small piston positioned as shown in Fig. 2.

If before the working stroke of the piston 45 the piston 49 is not driven the full length of its forward stroke, the piston 45 will move forwardly and engage the flange 51 of the tube 50 to move the piston 48 together with the tube 50 into the position shown in Fig. 3 irrespective of the piston 49 and rod 53. In other words, it is clear that the full working stroke of the piston 49 and rod 53 is not necessary to permit the full working stroke of the piston 45. For instance, the thickness of the work or the length of the rivet 105 may be such that the plunger 65 will engage the rivet before the end of the working stroke of the piston 49, in which instance the piston 49 and rod 53 will thereafter remain stationary irrespective of the working stroke of the piston 45 which will carry with it the tube 50 and piston 48.

When the valve 75 is again shifted into the position shown in Fig. 6, the motive fluid is admitted into the bottom of the chamber 47 through the passage 83 to act on the piston 48 for driving the same toward the left in Fig. 3. In this instance, the flange 51 of the tube 50 will engage the piston 45 for driving the same rearwardly, while the rear end of the chamber 44 is open to the atmosphere via the passage 84, the groove 85 and the port 86. During the rearward or return stroke of the pistons 48 and 45, the former will engage the piston 49 for driving it rearwardly from the position in Fig. 3 to the position in Fig. 1, thereby imparting axial movement to the rod 53 and effecting rotation of the sleeve nut 59 and gear 56. In this instance, it will be understood that the gear 56 being now rotated in the other direction, will impart rotation to the sleeve 34 resulting in its axial movement and in the similar movement of the plunger 65 from the position in Fig. 3 to the position in Fig. 1. During the return movement of the several parts above referred to, the roller 31 carried by the pin 32 will be moved back into its original position shown in Fig. 1 by the efforts of the compression springs 104 active on the links 35 and 36, thereby maintaining the roller 31 in engagement with the cam 39 and exerting pressure thereon in such a manner as to now effect its rotation in a clockwise direction in Fig. 3 to maintain the rounded ends 42 of the arms 41 in engagement with the tail 70 of the piston 45.

During the working stroke of the piston 45, lateral thrust exerted on the tail 70 by the arms 41 of the cam 39 is resisted by the roller 71 engaging the guide 72 of the tail 70.

As the piston 45 is moved forwardly causing the performance of the work by the plunger 65, the amount of pressure the plunger 65 is capable of exerting on the work may be controlled by regulating the tension of the compression spring 101 of the valve 102, which valve controls the port 99 opening into the large chamber 44 back of the piston 45, thereby controlling the maximum pressure of the motive fluid active on the piston 45, and the consequential pressure of the rivet set 18 on the rivet 105.

When it is desired to vary the initial stroke of the extensible rivet set 65, that is, the length of stroke from the position shown in Fig. 1 to that shown in Fig. 2, the cross pin 67 may be removed and the plunger 65 rotated by the operator rotating, for instance, the bushing 66. In this instance, rotation of the plunger 65 will result in its axial movement relative to the yoke 39 bringing it closer or further away from the work.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the class described, a movable tool, a rotatable member operatively associated with said tool for driving it into engagement with the work upon rotation of the member, rotation imparting means for said member including a power actuated slidable piston, and fluid actuated rotary means subsequently exerting pressure on said tool for performing the work irrespective of the rotation of said member.

2. In a device of the class described, a tool, a rotatable member, means responsive to the rotation of said member for imparting initial working movement to said tool, rotation imparting means for said member including a power actuated slidable piston, and rotary cam means operatively associated with said tool for imparting further working movement thereto.

3. In a device of the class described, a longitudinally slidable tool, a power actuated member slidable parallelly of said tool, coaxial with said member, deriving motion from the slidable movement of said member for actuating said tool, and a power actuated slidable piston operatively associated with said tool for imparting further slidable movement thereto.

4. In a device of the class described, a longitudinally movable tool, a longitudinally movable and rotatable element, connecting means between said tool and element whereby rotation of the element causes longitudinal movement of the tool into engagement with the work and longitudinal movement of the element is transmitted to the tool for performing the work, means including a power actuated slidable piston for rotating the element, and means for imparting longitudinal movement to the element.

5. In a device of the class described, a longitudinally movable tool, a longitudinally movable and rotatable sleeve, a screw threaded connection between said tool and sleeve whereby rotation of the sleeve causes longitudinal movement of the tool into engagement with the work and longitudinal movement of the sleeve is transmitted to the tool for performing the work, means including a power actuated slidable piston for rotating the sleeve, and means for imparting longitudinal movement to the sleeve.

6. In a device of the class described, a longitudinally movable coaxially disposed tool and stem locked against rotation, a member connecting said tool and stem in a manner effecting longitudinal movement of said tool into engagement with the work upon rotation of said member, means for rotating said member, a cam operatively associated with said stem for effecting longitudinal movement thereof upon rotation of said cam, the movement of said stem being transmitted by said member to said tool for performing the work, and means for rotating said cam.

7. In a device of the class described, a work supporting member, a tool movable into operative engagement with the work, a rotary element parallel to said tool, interengaging means between said tool and element effecting longitudinal movement of said tool into engagement with the work upon rotation of said element, a power actuated slidable piston, and means responsive to the slidable movement of said piston for imparting further longitudinal movement to said tool.

8. In a device of the class described, a longitudinally movable tool including inner and outer coaxially disposed sections, a uniting coupling member between said sections in screw threaded engagement therewith, power actuated means including a slidable piston imparting rotation to said coupling member for effecting longitudinal movement of said outer tool section into engagement with the work, and means for imparting longitudinal movement to said inner tool section for transmission to said outer section by said coupling member.

9. In a device of the class described, a longitudinal slidable tool, a power actuated piston slidable parallelly of said tool, rotary means deriving motion from the slidable movement of said piston for actuating said tool, a second power actuated piston slidable coaxially with the first piston, and pivotal means deriving motion from said second piston for imparting further slidable movement to said tool.

10. In a device of the class described, an extensible tool capable of longitudinal movement, a rotary member held against longitudinal movement, said member being associated with said tool for effecting its extension into engagement with the work, a cylinder, and a power actuated slidable piston within said cylinder operatively associated with said tool for effecting its longitudinal movement against the work independently of said member.

11. In a device of the class described, a housing, a reduced portion on said housing extending co-axially from one end thereof, a tool movable longitudinally from the other end of said housing, a first piston in said reduced portion having a tube extending into said housing, a second piston in said reduced portion having a rod slidably held in said tube and projecting beyond one end thereof, a power actuated piston within said housing and mounted for slidable movement on said tube, a rotatable member operatively associated with said tool for driving it into engagement with the work, said member adapted to be rotated upon slidable movement of said second piston, and means for exerting additional pressure on said tool subsequent to its engagement with the work.

12. In a device of the class described, a housing, a reduced portion on said housing extending co-axially from one end thereof, a tool movable longitudinally from the other end of said housing, a first piston in said reduced portion having a tube extending into said housing, a second piston in said reduced portion having a rod slidably held in said tube and projecting beyond one end thereof, a power actuated piston within said housing and mounted for slidable movement on said tube, a rotatable member operatively associated with said tool for driving it into engagement with the work, means for operatively connecting said rotatable member with said second piston whereby slidable movement thereof will rotate said member, and means for exerting additional pressure on said tool subsequent to its engagement with the work.

13. In a device of the class described, a housing, a reduced portion on said housing extending co-axially from one end thereof, a tool movable longitudinally from the other end of said housing, a first piston in said reduced portion having a tube extending into said housing, a second piston in said reduced portion having a rod slidably held in said tube and projecting beyond one end thereof, a power actuated piston within said housing and mounted for slidable movement on said tube, a rotatable member operatively associated with said tool for driving it into engagement with the work, means for operatively connecting said rotatable member with said slidable rod whereby movement thereof will rotate said member for driving said tool into engagement with the work, and means actuated by said power piston for exerting additional pressure on said tool subsequent to its engagement with the work.

PAUL VAN SITTERT.